United States Patent
Goren et al.

(10) Patent No.: US 10,540,874 B2
(45) Date of Patent: *Jan. 21, 2020

(54) BATTERY OPERATED DEVICE AND TAG FOR A BATTERY OPERATED TOOL

(71) Applicant: The Stanley Works Israel Ltd., Rosh Ha'Ayin (IL)

(72) Inventors: Ori Goren, Shoham (IL); Roi Tsukran, Rishon Lezion (IL); Amir Katz, Bat Hefer (IL)

(73) Assignee: The Stanley Works Isreal Ltd., Rosh Ha'Ayin (IL)

( * ) Notice: Subject to any disclaimer, the term of this patent is extended or adjusted under 35 U.S.C. 154(b) by 26 days.

This patent is subject to a terminal disclaimer.

(21) Appl. No.: 15/838,821

(22) Filed: Dec. 12, 2017

(65) Prior Publication Data

US 2018/0114423 A1 Apr. 26, 2018

Related U.S. Application Data

(63) Continuation of application No. 15/689,610, filed on Aug. 29, 2017, now Pat. No. 9,875,629, which is a continuation of application No. 15/582,835, filed on May 1, 2017, now Pat. No. 9,779,601, which is a continuation of application No. 15/373,026, filed on Dec. 8, 2016, now Pat. No. 9,672,708, which is a
(Continued)

(51) Int. Cl.
*G08B 13/24* (2006.01)
*G06K 7/01* (2006.01)
(Continued)

(52) U.S. Cl.
CPC ......... *G08B 13/2405* (2013.01); *G06K 7/01* (2013.01); *G06K 19/0723* (2013.01); *G06K 19/07743* (2013.01); *G08B 13/1418* (2013.01); *G08B 13/1427* (2013.01); *G08B 13/2417* (2013.01); *G08B 13/2434* (2013.01); *G08B 21/0213* (2013.01); *G08B 21/0288* (2013.01); *G08B 21/0291* (2013.01); *H04B 1/38* (2013.01); *H04W 4/80* (2018.02); *H05K 5/02* (2013.01);
(Continued)

(58) Field of Classification Search
CPC .................................................. G08B 13/2434
See application file for complete search history.

(56) References Cited

U.S. PATENT DOCUMENTS 9,189,663 B2 11/2015 Goren et al.
9,875,629 B2 * 1/2018 Goren ................ G08B 13/2434
(Continued)

FOREIGN PATENT DOCUMENTS

EP 226457 12/2010

*Primary Examiner* — Joseph H Feild
*Assistant Examiner* — Pameshanand Mahase
(74) *Attorney, Agent, or Firm* — Stephen R. Valancius

(57) ABSTRACT

A device tag including a housing that includes a first connector structure constructed and arranged to engage with a battery operated device and a second connector structure constructed and arranged to slidingly engage with a battery such that the device tag is provided between the battery operated device and the battery. The device tag also includes an electrical connector carried by the housing and constructed and arranged to provide an electrical connection between the battery operated device and the battery. The device tag further includes an electronic device carried by the housing and constructed and arranged to transmit electrical signals.

15 Claims, 10 Drawing Sheets

Related U.S. Application Data continuation of application No. 15/232,306, filed on Aug. 9, 2016, now Pat. No. 9,547,965, which is a continuation of application No. 14/935,781, filed on Nov. 9, 2015, now Pat. No. 9,449,268, which is a continuation of application No. 13/681,770, filed on Nov. 20, 2012, now Pat. No. 9,189,663.

(60) Provisional application No. 61/566,294, filed on Dec. 2, 2011.

(51) Int. Cl.

| | | |
|---|---|---|
| *G06K 19/07* | (2006.01) | |
| *H05K 5/02* | (2006.01) | |
| *G08B 13/14* | (2006.01) | |
| *G08B 21/02* | (2006.01) | |
| *G06K 19/077* | (2006.01) | |
| *H04W 4/80* | (2018.01) | |
| *H04B 1/38* | (2015.01) | |

(52) U.S. Cl.
CPC ...... *G08B 13/2454* (2013.01); *G08B 21/0275* (2013.01)

(56) References Cited

U.S. PATENT DOCUMENTS

| | | |
|---|---|---|
| 2004/0252030 A1 | 12/2004 | Trimble |
| 2005/0174255 A1 | 8/2005 | Horter |
| 2008/0088454 A1 | 4/2008 | Flores et al. |
| 2008/0220324 A1* | 9/2008 | Phillips ............. B25F 5/02 429/120 |
| 2008/0238609 A1 | 10/2008 | Wiesner |
| 2008/0311795 A1* | 12/2008 | Brotto ............. B25F 5/029 439/628 |
| 2009/0072029 A1 | 3/2009 | Martin |
| 2009/0108806 A1 | 4/2009 | Takano et al. |
| 2010/0295665 A1 | 11/2010 | Landau |
| 2011/0006879 A1 | 1/2011 | Lambrou et al. |
| 2011/0025472 A1 | 2/2011 | Kang |
| 2011/0133496 A1* | 6/2011 | Cooper ............. B25F 5/02 292/341.15 |
| 2011/0273296 A1 | 11/2011 | Lasse |
| 2013/0141217 A1 | 6/2013 | Goren |
| 2013/0154560 A1 | 6/2013 | Walley et al. |
| 2013/0164567 A1* | 6/2013 | Olsson ............. H01M 10/488 429/7 |

\* cited by examiner

BATTERY OPERATED DEVICE AND TAG FOR A BATTERY OPERATED TOOL

CROSS-REFERENCE TO RELATED APPLICATIONS

This is a continuation application of U.S. application Ser. No. 15/582,835 filed May 1, 2017; which is a continuation application of U.S. application Ser. No. 15/373,026 filed Dec. 8, 2016, now U.S. Pat. No. 9,672,708; which is a continuation of U.S. application Ser. No. 15/232,306 filed Aug. 9, 2016, now U.S. Pat. No. 9,547,965; which is a continuation of U.S. application Ser. No. 14/935,781 filed Nov. 9, 2015, now U.S. Pat. No. 9,449,268; which is a continuation application of U.S. application Ser. No. 13/681,770, filed Nov. 20, 2012, now U.S. Pat. No. 9,189,663; which claims the benefit of U.S. Provisional Application No. 61/566,294, filed Dec. 2, 2011. U.S. application Ser. Nos. 15/582,835; 15/232,306; 14/935,781; 13/681,770 and 61/566,294 are hereby incorporated by reference in their entirety.

BACKGROUND OF THE INVENTION

The present invention relates to a battery operated device and a device tag for a battery operated device.

Battery operated devices are often expensive and subject to theft and/or unauthorized use. The present disclosure addresses this issue.

SUMMARY

One aspect of the invention provides a device tag including a housing that includes a first connector structure constructed and arranged to engage with a battery operated device and a second connector structure constructed and arranged to engage with a battery such that the device tag is provided between the battery operated device and the battery. The device tag also includes an electrical connector carried by the housing and constructed and arranged to provide an electrical connection between the battery operated device and the battery. The device tag further includes an electronic device carried by the housing and constructed and arranged to transmit wireless data signals.

Another aspect provides a battery operated electronic device that includes a battery operated device, a battery for operating the battery operated device; and a device tag that includes a housing releasably connectable to the device and the battery. The device tag provides an electrical path between the device and the battery to enable the battery to power the device. The device tag further includes an electronic device constructed and arranged to transmit wireless data signals.

Another aspect provides a method of operating a battery operated electronic device. The method includes the steps of connecting a device tag between a battery and a battery operated device and conducting power between the battery and the battery operated device through the device tag. The method also includes the step of transmitting wireless data signals with the device tag.

These and other aspects of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one embodiment, the structural components illustrated herein can be considered drawn to scale. It is to be expressly understood, however, that the drawings are for the purpose of illustration and description only and are not a limitation of the invention. In addition, it should be appreciated that structural features shown or described in any one embodiment herein can be used in other embodiments as well. As used in the specification and in the claims, the singular form of "a", "an", and "the" include plural referents unless the context clearly dictates otherwise.

DETAILED DESCRIPTION OF THE INVENTION

Figure 1:
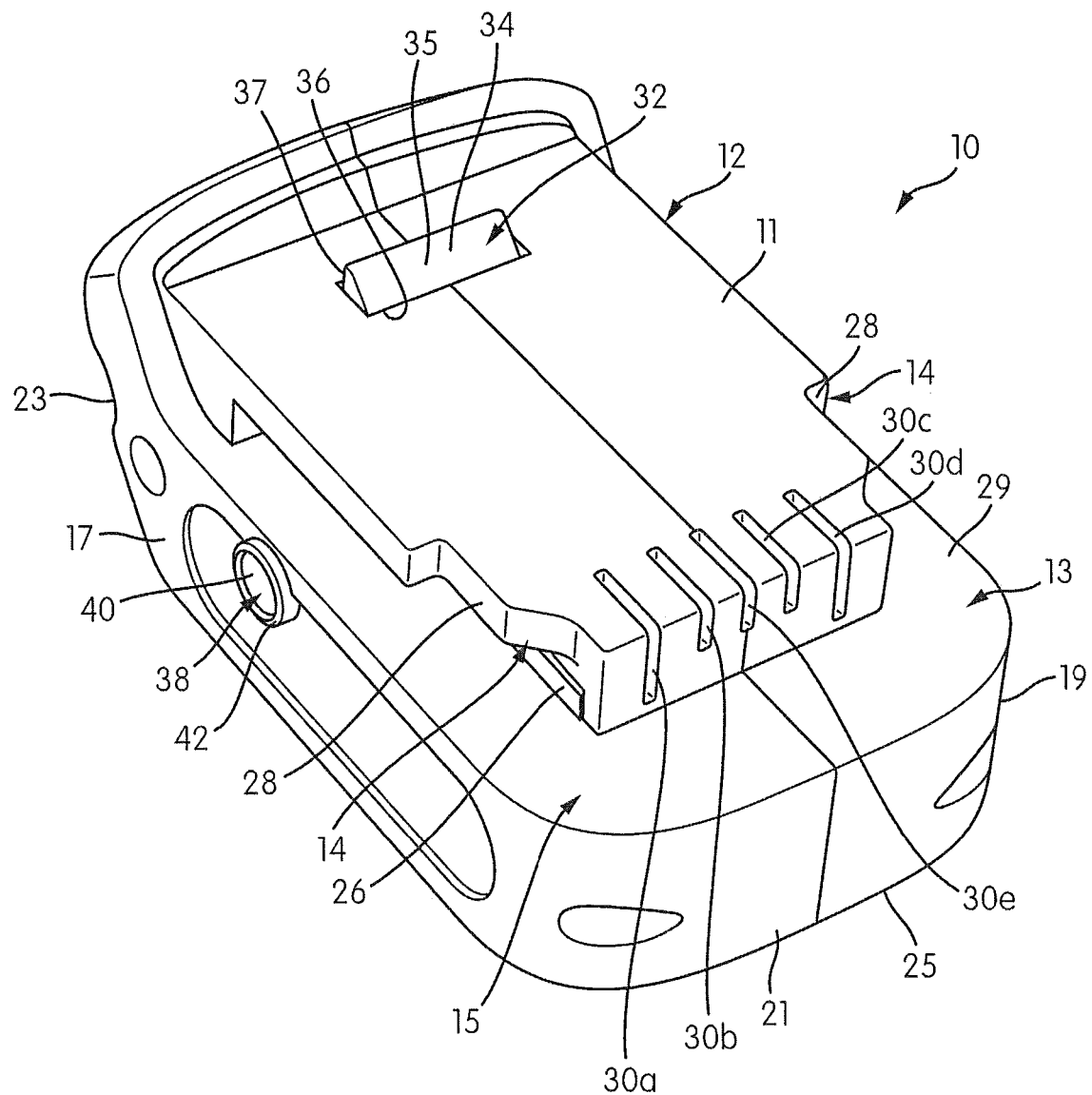
FIG. 1 is a front perspective view of a device tag in accordance with an embodiment.

FIG. 1 shows a device tag 10 in accordance with an embodiment. The device tag 10 includes a housing 12 that has a first connector structure 14 (two are shown in this embodiment) constructed and arranged to slidingly engage with a battery operated device. For purposes of this disclosure, the battery operated device is a power tool. While the device tag has particular benefits as applied to power tools, which are often used in secured locations and subject to unauthorized use and/or theft, aspects of the present invention can also be used with other battery operated devices, such as computers (e.g., lap tops, automobile, smart phones, etc.). The power tool embodiment is described in more detail herein and is illustrated in various figures (see, e.g., power tool 16 in FIGS. 2, 7, and 8).

The housing 12 also includes a second connector structure 18 (two are shown in FIG. 6a) constructed and arranged to slidingly engage with a battery 20 (see FIG. 2) such that the device tag 10 is located between the battery operated device 16 and the battery 20. The battery 20 may be a lithium ion battery, NiCad, or other types of batteries.

Figure 3:
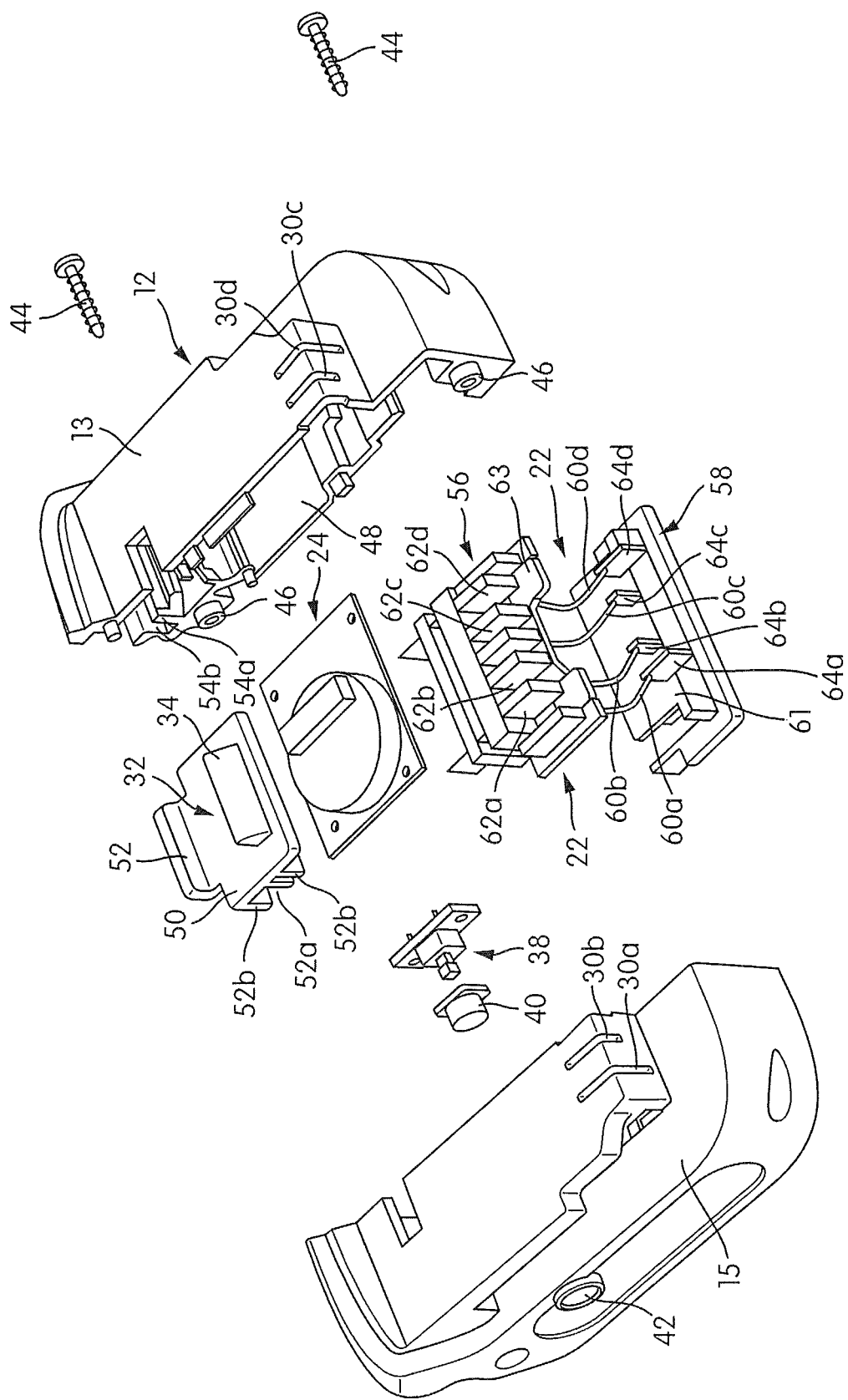
FIG. 3 is an exploded view of the device tag in accordance with an embodiment.

As shown in FIG. 3, the device tag 10 also includes an electrical connector 22 constructed and arranged to provide an electrical connection between the battery operated device 16 and the battery 20. The device tag 10 further includes an electronic device 24 carried by the housing 12 and that is configured to transmit and/or receive wireless data signals. Alternatively or additionally, in some embodiments, the device tag 10 may also have its own power source (e.g., a battery) provided, just for example, in the housing 12. In one embodiment, the electronic device 24 includes a wireless communication tag, taking the form of an RFID tag 91 (see FIG. 6) in this embodiment, configured to transmit wireless data signals to communicate with a control unit 84 (see FIG. 6). In this embodiment, the control unit 84 has an RFID reader 86 configured to communicate with the RFID tag 91 of the electronic device 24. The control unit 84 may be of the type described in U.S. patent application Ser. No. 12/785,249, which is incorporated herein in its entirety. The electrical connector 22 and the electronic device 24 will be described in more detail later. It should be appreciated that in other embodiments, the electronic device 24 may include other types of wireless communication tags and may communicate with the control unit 84 via other methods of communications, such as, just for example, satellite signals, personal area networks (IrDA, Bluetooth, UWB, Z-Wave, and Zigbee).

Referring back to FIG. 1, the housing 12 includes a first portion 13 and a second portion 15 that can be connected to each other to form the housing 12. The housing 12 may also include an upper portion 11, side portions 17, 19, front and rear portions 21, 23, and a bottom portion 25. An intermediate portion 29 may be provided between the upper portion 11 and the bottom portion 25.

In one embodiment, the upper portion 11 is constructed and arranged to contact at least a portion of the battery operated device 16. It should be appreciated that in other embodiments, the housing 12 may be a single component or may be multiple portions connected together. In one embodiment, the first and second portions 13, 15 are each constructed from rigid plastic or other suitable materials. Openings 30a-30e may be provided in the housing 12 to receive terminal connections from the battery operated device 16 such that the battery operated device 16 can electrically connect to the electrical connector 22 in the device tag 10. The openings 30a, 30b, 30c, 30d may have a similar configuration as openings 31a, 31b, 31c, 31d formed in the battery 20 (see FIG. 7). Referring back to FIG. 1, each portion 13, 15 includes the first connector structure 14 that engages with the battery operated device 16. In this embodiment, each of the first connector structures 14 includes a groove 26 and a rail 28 provided above the groove 26. The groove 26 may be constructed and arranged to receive an associated rail of an engaging portion 27 (see FIG. 2) of the battery operated device 16. Alternatively or additionally, the rail 28 may be constructed and arranged to be received in an associated groove formed in the engaging portion 27 the battery operated device 16. Accordingly, in addition to connecting the device tag 10 with the battery operated device 16, the grooves 26 and the rails 28 of the first connector structures 14 may be constructed and arranged to help align the openings 30a-30e of the housing 12 with the terminal connections of the battery operated device 16 such that the battery operated device 16 can be electrically connected to the electrical connector 22 of the device tag 10.

In the embodiment shown in FIG. 1, the device tag 10 includes a latch 32 constructed and arranged to latch the device tag 10 to the battery operated device 16. When the device tag 10 is engaged with the battery operated device 16, the latch 32 may be received in a groove or latch receiving region formed in the engaging portion 27 of the battery operated device 16 to prevent movement of the device tag 10 relative to the battery operated device 16. The latch 32 includes an engaging portion 34 constructed and arranged to protrude from an opening 36 formed in the housing 12. The engaging portion 34 may include a sloped surface 35 and an engaging surface 37. The latch 32 is moveable between a latched position wherein removal of the device tag 10 from the battery operated device 16 is prevented and an unlatched position wherein removal of the device tag 10 from the battery operated device 16 is permitted. The latch 32 may be biased in the latched position by a resilient member (not shown), such as a spring. In some embodiments, the latch 32 may be made of resilient material such that the latch 32 itself may function to bias the latch 32 in the latched position.

In one embodiment, the device tag 10 also includes an actuator 38 constructed and arranged to be actuatable by a user. The actuator 38 includes a contact portion 40 protruding from an opening 42 in the housing 10 and engageable by a user to actuate the actuator 38. In one embodiment, the actuator 38 may be constructed and arranged to prompt the electronic device to transmit signals to the control unit when the actuator 38 is actuated.

Figure 2:
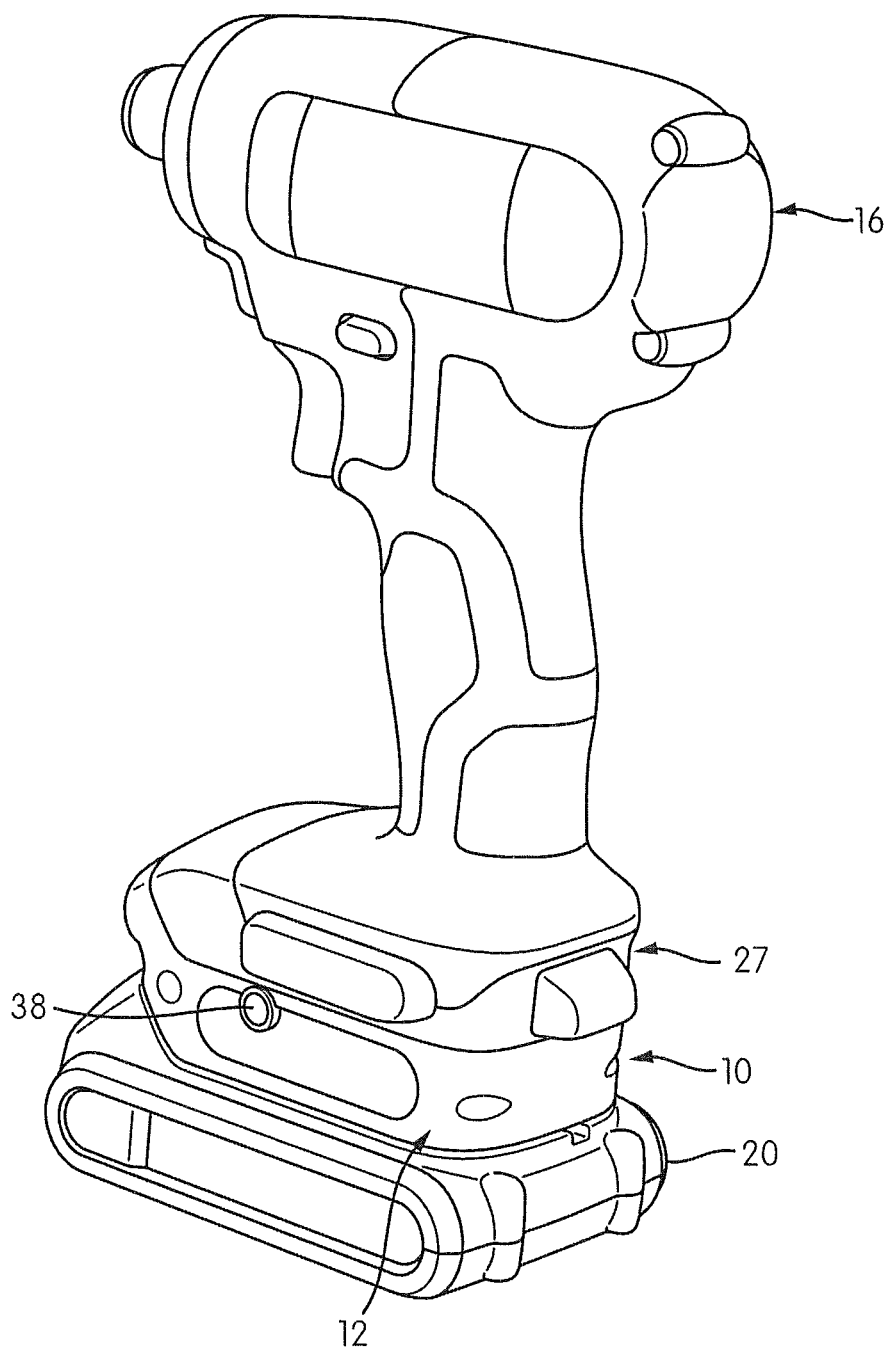
FIG. 2 is a perspective view of the device tag connected to a battery operated device and a battery in accordance with an embodiment.

FIG. 2 shows the device tag 10 connected to the battery operated device 16 and to the battery 20. In this embodiment, the device tag 10 is provided between the battery operated device 16 and the battery 20 and electrically connects the battery operated device 16 and the battery 20 such that power is provided from the battery 20 to the battery operated device 16. The battery operated device 16 may be a drill, driver, nailers, staplers, saws, or any other type of tool that is powered by a battery.

FIG. 3 shows an exploded view of components of the device tag 10 in accordance with an embodiment. In this embodiment, the two portions 13, 15 of the device tag 10 may be connected to each other via attachment mechanisms 44, such as screws, pins, adhesives, or other types of attachment mechanisms. Openings 46 may be provided in the two portions 13, 15 to receive the attachment mechanisms 44. The portions 13, 15 may include interior spaces 48 (the interior space 48 of the portion 15 is obstructed from view in this Figure) constructed and arranged to receive the components.

As shown in FIG. 3, the latch 32 includes the engaging portion 34, a main portion 50, a contact portion 52 extending from the main portion 50, and grooves 52a and ridges 52b. The contact portion 52 may be engageable by the user to move the latch 32 between the unlatched and latched positions. For example, the contact portion 52 may be depressed by the user to move the latch 32 from the latched position to the unlatched position. The grooves 52a and ridges 52b may be constructed and arranged to receive and be received in ridges 54a and grooves 54b, respectively, formed in the first and second portions 13, 15 of the housing 12. As mentioned above, a resilient member (not shown) may be provided to bias the latch 32 in the latched position. In some embodiments, the latch 32 may be made of resilient materials such that the latch 32 may bias itself in the latched position. In other embodiments, the housing portions 13, 15 may be provided with resilient members or at least a portion of the housing portions 13, 15 may be made of resilient material that biases the latch 32 in the latched position.

Figure 4A:
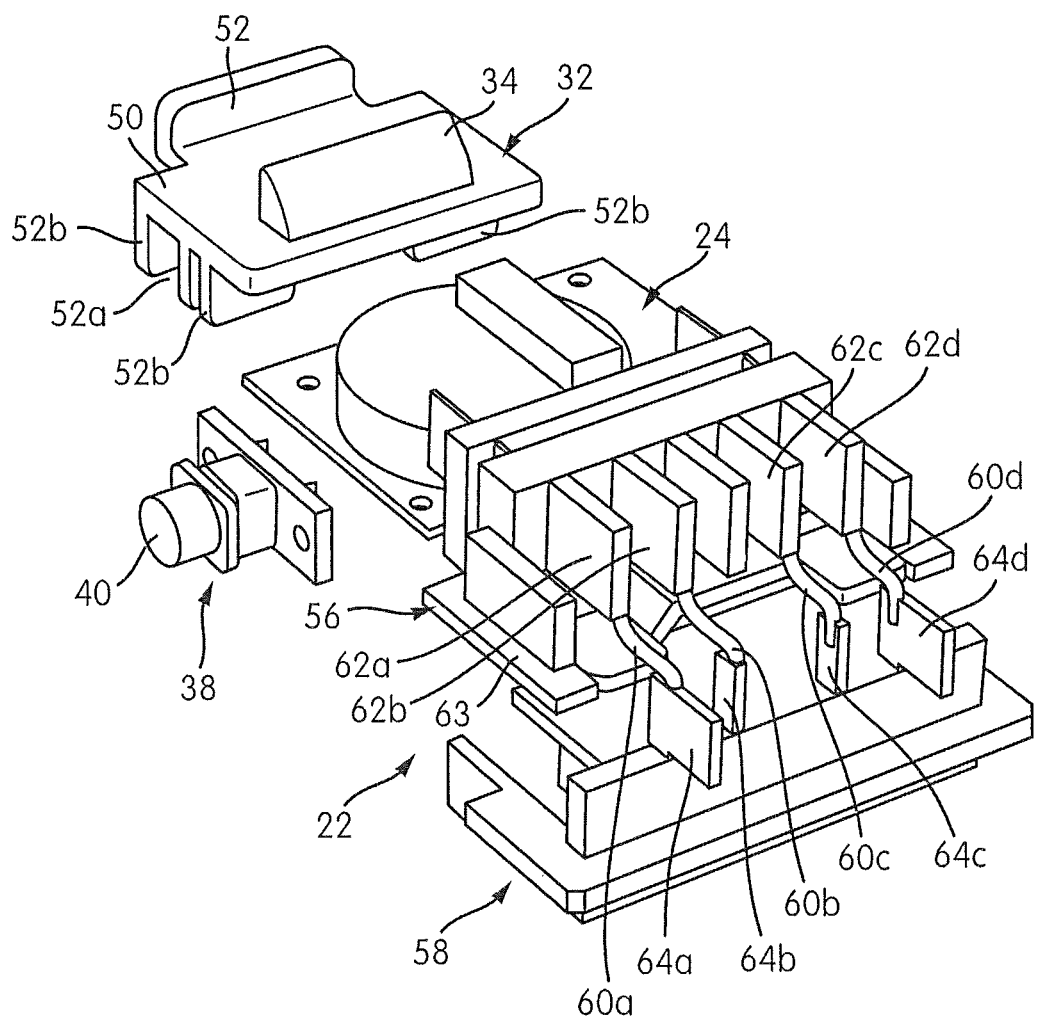
FIG. 4a is a perspective view of portions of the device tag, with portions removed to better reveal others, in accordance with an embodiment.

In the embodiment of FIG. 3, the electronic components assembly 22 includes a first terminal structure or block 56 constructed and arranged to be electrically connected to the battery operated device 16. The electrical connector 22 also includes a second terminal structure or block 58 constructed and arranged to be electrically connected to the battery 20. The first terminal block 56 may be electrically connected to the second terminal block 58 via wires 60a-60d. In this embodiment, the terminal block 58 includes tool blade terminals 62a-62e and a main portion 63. The tool blade terminals 62a-62e may be planar-shaped blade terminals that are generally perpendicular to the main portion 63 of the terminal block 56. In one embodiment, two of the tool blade terminals 62a-62d (e.g., the blade terminals 62a, 62d) are positive and negative terminals. Two other tool blade terminals 62a-62d (e.g., 62b, 62c) may be used to monitor information associated with the battery 20 or the battery operated device 16. For example, the other two blade terminals 62a-62d may be used to transfer information associated with the battery 20 to the battery operated device 16, or may be used to transfer information associated with the battery operated device 16 to the device tag 10. The tool blade terminals 62a-62e may be made of conductive material, such as copper, aluminum, zinc, silver, gold, other materials, or a combination thereof. In one embodiment, the openings 30a-30e in the housing 12 may correspond with the terminals 62a-62e. Accordingly, terminal connections from the battery operated device 16 may be inserted into the openings 30a-30e and may contact the tool blade terminals 62a-62e through the openings 30a-30e when the device tag 10 and the battery operated device 16 are connected. As mentioned above, the wires 60a-60d may be used to electrically connect the first terminal block 56 with the second terminal block 58. FIG. 4a shows in more detail the electrical connections between the first terminal block 56 and the second terminal block 58. The second terminal block 58 may include terminal connecting portions 64a-64d, which may be electrically connected to battery blade terminals 66a-66d (see FIG. 5a). The terminal connecting portions 64a-64d generally extend perpendicularly to an upper side 61 of the second terminal block 58. The terminal connecting portions 64a-64d and/or the battery blade terminals 66a-66d may be made of conductive material, such as copper, aluminum, zinc, silver, gold, other materials, or a combination thereof. The battery blade terminals 66a-66d may generally extend perpendicularly to a lower side 65 (see FIG. 5a) of the second terminal block 58.

Figure 4B:
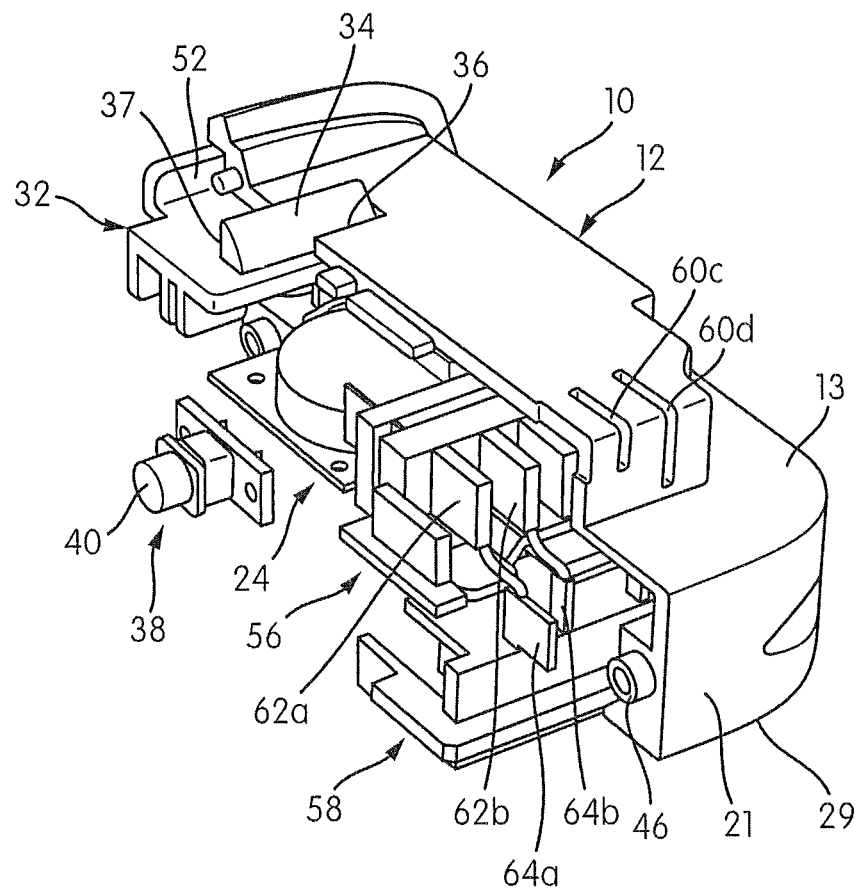
FIG. 4b is an exploded view of some components of the device tag.

As shown in FIG. 4b, the electronic device 22 may be located behind the first terminal block 56. That is, the first terminal block 56 may be located closer to the front portion 21 of the housing 12 than the electronic device 22. The electronic device 22 may be located closer to the front side 21 than the latch 32. In some embodiments, the latch 32 may be connected to a switch, such as a mechanical switch or a magnetic switch, that detects removal of the device tag 10 from the battery operated device 16. For example, in some embodiments, the latch 32 may be connected to a mechanical switch that detects movement of the latch 32 to the unlatched position. In some embodiments, sensors may be used to detect movement of the latch 32. In some embodiments, the switch or other sensors may be provided on other portions of the housing 12 to detect removal of the device tag 10 from the battery operated device 16.

Figure 5A:
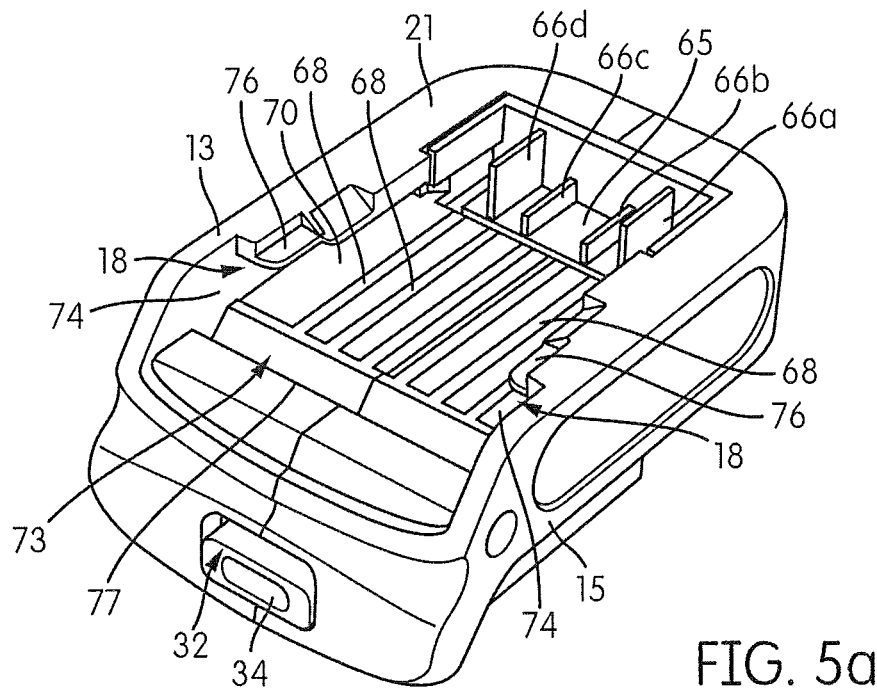
FIG. 5a is a bottom perspective view of the device tag in accordance with an embodiment.
Figure 5B:
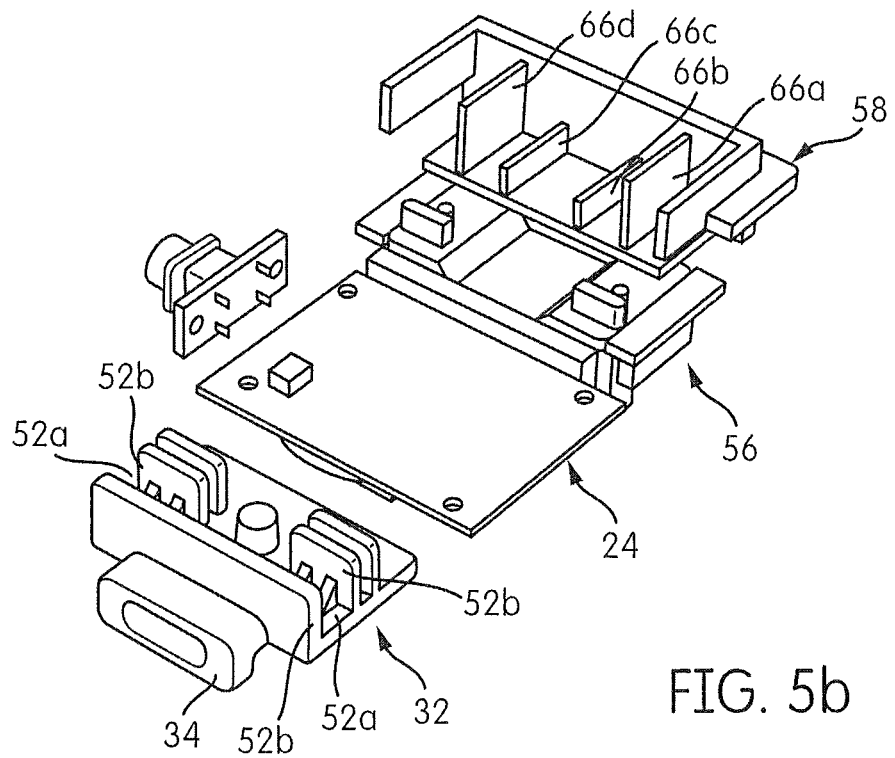
FIG. 5b is an exploded view from the bottom of some components of the device tag in accordance with an embodiment.
Figure 5C:
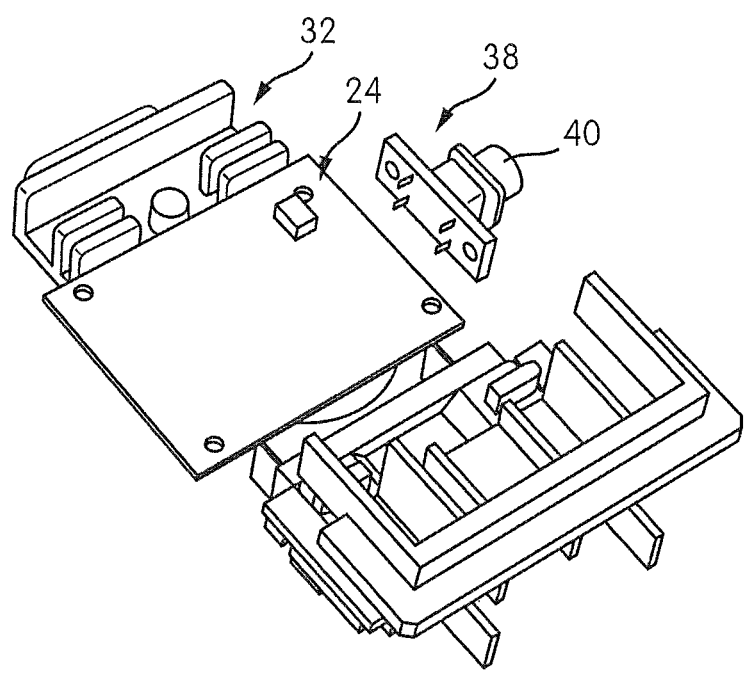
FIG. 5c is an exploded view from the bottom of some components of the device tag in accordance with an embodiment.

FIG. 5a a bottom perspective view of the device tag 10. In this embodiment, the battery blade terminals 66a-66d are constructed and arranged to be inserted into the openings 31a-31d of the battery 20 to electrically connect the battery 20 and the device tag 10. The battery 20 may include terminal connectors configured to electrically connect or contact the battery blade terminals 66a-66d to electrically connect the device tag 10 with the battery 20. The terminal connectors of the battery 20 may have a similar configuration as the tool blade terminals 62a-62d of the device tag 10. Two of the battery blade terminals 66a-66d (e.g., the blade terminals 66a, 66d) may be the negative and positive terminals. Two other battery blade terminals 66a-66d (e.g., the blade terminals 66b, 66c) may be used to monitor information associated with the battery 20. For example, the other two blade terminals 62a-62d (e.g., the blade terminals 66b, 66c) may be used to transfer information associated with the battery 20 to the device tag 10 and/or the battery operated device 16. The device tag 10 may include an opening or receiving space 70 constructed and arranged to receive at least portions of the battery 20 when the battery 20 is connected to the device tag 10. An inner surface 72 of the device tag 10 may partially define the receiving space 70. Elongated ridges 68 may be provided on the inner surface 72 to facilitate sliding movement of the battery 20 during connection or engagement of the battery 20 with the device tag 10. A latch engaging structure 73, taking the form of a groove in this embodiment, may be provided on the inner surface 72, the latch engaging structure 73 being constructed and arranged to receive a latch 75 (see FIG. 7) of the battery 20. Referring back to FIG. 5a, the latch engaging structure 73 may also include a stop portion 77 constructed and arranged to abut against a portion of the latch 75 of the battery 20 when the battery 20 is engaged with the device tag 10 to prevent movement of the battery 20 relative to the device tag 10. The engaging portion 27 of the battery operated device 16 may have a similar configuration as the bottom portion 21 of the device tag 10. That is, the engaging portion 27 of the battery operated device 16 may have similar connecting structures, latch engaging structure, and blade terminals as the second connecting structures 18, latch engaging structure 73 and blade terminals 66a-66d of the device tag 10. Accordingly, it should be appreciated that the engaging portion 27 of the battery operated device 16 may be constructed and arranged to be directly engageable or connectable with the battery 20.

In this embodiment, each of the first and second portions 13, 15 include the second connector structure 18. Each of the connector structures 18 includes a groove 74 and a rail 76. The groove 74 may be defined between the rail 76 and the inner surface 72 of the device tag 10. In one embodiment, the rails 76 are constructed and arranged to be received in associated grooves 78 (see FIG. 7) of the battery 20 and the grooves 74 are constructed and arranged to receive associated rails 80 (see FIG. 7) of the battery 20. In such an embodiment, the grooves 78 and the rails 80 of the battery 20 define the connecting structure 82 (see FIG. 7) of the battery. The second connector structures 18 of the device tag 10 and the connecting structure 82 of the battery 20 may be used to align the blade terminals 66a-66d of the device tag 10 with the openings 31a-30d of the battery 20 and to connect the device tag 10 with the battery 20.

Figure 6:
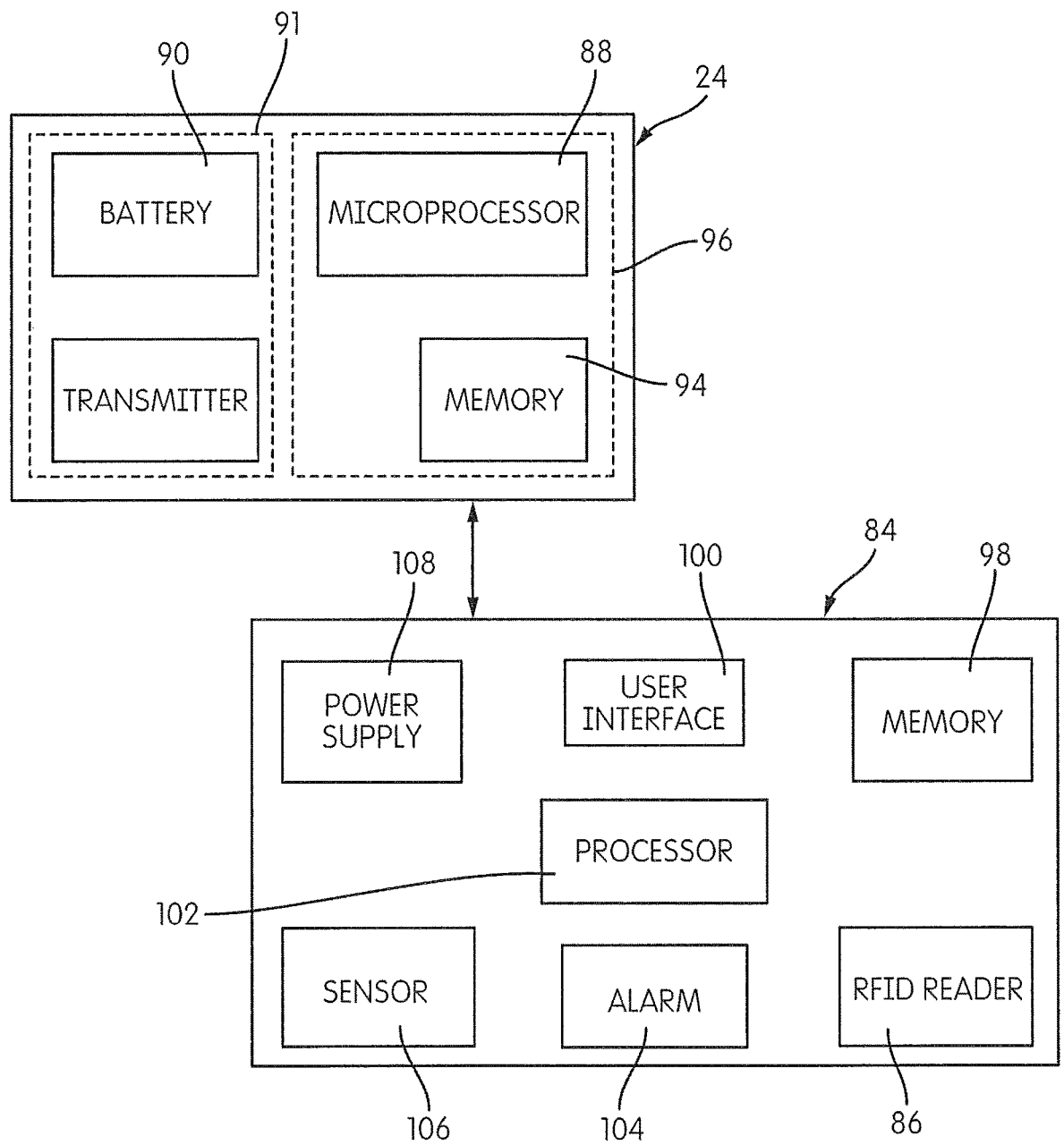
FIG. 6 is a schematic diagram of an electronic device of the device tag and a control unit in communication with the device tag in accordance with an embodiment.

FIG. 6 is a schematic representation of the electronic device 24. In this embodiment, the electronic device 24 includes an RFID tag 91 including a transmitter 92 and an optional power supply 90 (e.g., a battery). The RFID tag 91 may also include an antenna (not shown) and a receiver (not shown) for receiving signals from the control unit 84. However, it should be appreciated that in some embodiments, the RFID tag 91 may include only the transmitter 92 and may be configured to only transmit signals. The electronic device 24 may also include a microprocessor 88 and a memory 94. The microprocessor 88 and the memory 94 may define a controller 96. The microprocessor 88 and the memory 94 of the controller 96 may be part of the RFID tag 91 or may be separate from the RFID tag 91. For example, in some embodiments, the RFID tag 91 may also have a separate microprocessor and/or memory in addition to the microprocessor 88 and memory 96 of the controller 96. In some embodiments, the electronic device 22 may be an RFID tag 91 having any combination of the transmitter, the power supply, the microprocessor, and the memory. In some embodiments, the controller 96, including the microprocessor 88 and the memory 94, may be defined on a separate electronic device and may be configured to communicate with the RFID tag 91. In such embodiments, the controller 96 may process information received by the RFID tag 91 and optional sensors of the RFID tag 91. It should be appreciated that the RFID tag 91 may include any combination of the transmitter 92, the power supply 90, microprocessor, and memory. The memory 94 may be nonvolatile memory, such as read-only memory, flash memory, ferroelectric RAM or volatile memory. The electronic device 24 may be the same or similar to the object identification devices described in U.S. patent application Ser. No. 12/785,249, which is incorporated herein by reference in its entirety.

The electronic device 22 may optionally have built-in sensor capabilities that sense temperature, humidity, movement, and/or shock. In one embodiment, the electronic device 22 includes a movement/acceleration sensor (not shown) configured to sense movement of the device tag 10. The RFID tag 91 of the electronic device 22 may be configured to transmit signals containing both identification codes and information associated with whether the device tag 10 is moving or stationary. Each device tag 10 may be associated with a unique identification code. In one embodiment, the RFID tag 91 is a long range active devices capable of transmitting at, just for example, 2.4 GHz. In one embodiment, the RFID tag 91 is a short range passive RFID devices capable of transmitting at, just for example, 125 kHZ. For passive RFID devices, the RFID reader 86 of the control unit 84 may emit a low-power radio wave field which is used to power the passive device so that the passive device can transmit radio frequency signals upon receiving interrogation signals from the RFID reader 86. Active RFID devices include their own power source and are capable of receiving and transmitting radio frequency signals over a much longer range than passive devices. Active RFID devices can also power an internal clock and transmit time and date stamp to a recorded event.

FIG. 6 shows the control unit 84, which as discussed above, may be similar to the control unit described in U.S. patent application Ser. No. 12/785,249, which is incorporated herein by reference in its entirety. In general, the control unit 84 includes the RFID reader 96, a memory 98, a user interface 100, a processor 102, an alarm 104 to indicate unauthorized use or other events, optional sensors 106, and a power supply 108 (e.g., a battery). The processor 102 of the control unit 84 may process information received from the RFID tag 91 of the device tag 10. The memory 98 may include a database that is configured to store identification codes of the device tags 10, events associated with the device tag 10, and other information associated with the device tag 10. The memory 98 may also store information associated with the "checking out" of the device tag 10 from a predetermined area, such as the container described in U.S. patent application Ser. No. 12/785,249. That is, the control unit 84 may be placed in or near the predetermined area (e.g., a container or toolbox). A user may have a user identification device (e.g., RFID devices) capable of transmitting signals relating to a unique user identification code.

The identification codes for the user identification devices may be stored in the memory 98 of the control unit 84. An authorized user may "check out" the battery operated device 16 such that the battery operated device 16 may be removed from the predetermined area and assigned to the user. The authorized user may be one associated with an authorized user identification device (i.e., an user identification device with a user identification code stored in the memory 98 of the control unit 84). During the checkout process, the control unit 84 may receive user identification codes from the user identification device associated with the authorized user and the object identification code from the device tag 10 associated with the battery operated device 16. The object identification code and the user identification code may be associated with each other in the memory 98 of the control unit 84. If a user does not have an authorized user identification device, the user may be considered "unauthorized user." When a battery operated device 16 and its associated device tag 10 are removed from the predetermined area without an authorized user identification device, the use is considered "unauthorized." In such cases, the control unit 84 may log this as an unauthorized event or hostile event. Alarms or other indications may be generated by the control unit 84. In some embodiments, signals indicating the unauthorized use may be transmitted to the device tag 10 for further action, which will be described in more detail below. It should also be appreciated that in some embodiments, the control unit 84 may use alternative or additional types of communication. That is, in addition to RFID signals or instead of RFID signals, the control unit 84 and the device tag 10 may communicate via other methods of communications, such as, just for example, satellite signals, personal area networks (IrDA, Bluetooth, UWB, Z-Wave, and Zigbee). Accordingly, the device tag 10 may include receivers or other types of devices configured to receive from and/or transmit signals to the control unit 84. The control unit 84 may communicate with a plurality of device tags 10 each associated with a battery operated device 16. The device tags 10 may broadcast over a portion of the electromagnetic spectrum to communicate with the control unit 84. In some embodiments, the device tags 10 may transmit signals at different frequencies to avoid interferences.

The device tag 10 may be configured to transmit signals to the control unit 84 to indicate the status of the device tag 10 and its associated battery operated device 16. For example, in one embodiment, the device tag 10 may be configured to transmit signals indicating low battery when the power in the battery 20 is low. Signals may also be transmitted when the device tag 10 senses the removal thereof from the battery operated device 16. Other alarm indications or other events may occur when the device tag 10 senses a hostile event, such as the removal of the device tag 10 from the battery operated device 16, which will be described in more detail later. The device tag 10 may also transmit signals when the actuator 38 is actuated by the user. For example, during check out and when the device tag 10 and its associated battery operated device 16 is in the predetermined area, the user with an authorized user identification device may actuate the actuator 38. The control unit 84 may receive signals from the device tag 10 indicating the object identification code and receive signals from the user identification device indicating the user identification code. The user identification code may then be associated with the object identification code in the database and recorded as a check out event in the database.

In one embodiment, the device tag 10 may continue to transmit signals during rest or in movement at selected intervals after the battery operated device 16 has been checked out and the object identification code of the associated device tag 10 is associated with a user identification code. For example, during movement, which may be sensed by an acceleration sensor or movement sensor in the device tag 10, the device tag 10 may transmit signals to the control unit 84 at a predetermined interval (e.g., every 2 seconds). During rest, the device tag 10 may transmit signals to the control unit 84 at another predetermined interval (e.g., every 30 seconds). It should be appreciated that in some embodiments, the device tag 10 may transmit signals at the same interval during both rest and movement. The intervals may be preprogrammed or may be user programmed.

When the battery operated device 16 and its associated device tag 10 is removed by an unauthorized user from the predetermined area, the use may be considered unauthorized. In such situations, the user does not have a valid user identification device that transmits a valid user identification code. Unauthorized use occurs when there is no user identification device that is read or sensed when the battery operated device 16 and its associated device tag 10 is removed from the predetermined area. Unauthorized use may also occur when a user identification device is sensed and read by the control unit 84, but the user identification code associated with the user identification device is not stored in the control unit 84, not recognized by the control unit 84, or is identified as being associated with a user who is not given permission to use the battery operated device 16. Accordingly, a user who does not have a recognizable user identification device will be determined by the control unit 84 to be an unauthorized user. Unauthorized use may be considered a hostile event that causes an alarm to be generated or other events to occur. In one embodiment, the control unit 84 may be constructed and arranged to transmit a signal to the device tag 10 indicating unauthorized use has occurred.

In one embodiment, the device tag 10 is configured to disable power from the battery 20 to the battery operated device 16 in response to receiving signals from the control unit 84 that the use of the battery operated device 16 is unauthorized. In such embodiments, the signal from the control unit 84 may be a signal or code that causes the device tag 10 to switch from an operative state wherein power is provided from the battery 20 to the battery operated device 16 to an inoperative state wherein power is disabled from the battery 20 to the battery operated device 16. In some embodiments, the controller 96 may be constructed and arranged to disable power upon receipt of the signal from the control unit 84. Alternatively or additionally, the control unit 84 may generate an alarm or other indication to indicate that there is unauthorized use of the battery operated device 16. In some embodiments, the device tag 10 may also generate an indication, such as via an audible alarm, vibration alarm, or lights, to indicate that the use of the battery operated device 16 is unauthorized. In some embodiments, the device tag 10 may include a switch configured to selectively enable or disable power to be provided from the battery 20 to the battery operated device 16. In response to receiving signals indicating unauthorized use, the controller 96 of the device tag 10 may effect the switch to disable power from being provided from the battery 20 to the battery operated device 16. Accordingly, the unauthorized user is unable to operate the battery operated device 16.

In other embodiments, the device tag 10 may generate signals at a predetermined interval before the device tag 10 and its associated battery powered device 16 have been checked out, and may cease to generate signals after the battery operated device 16 and the device tag 10 have been properly checked out. That is, after the battery operated device 16 and its associated device tag 10 have been associated with an authorized user having a valid user identification device, the device tag 10 may cease transmission of signals. In such embodiments, the device tag 10 may initially be in an inoperative state wherein no power is provided from the battery 20. During the checking out process wherein the object identification code of the device tag 10 is associated with a user identification code of a user identification device, the control unit 84 may be constructed and arranged to transmit a signal to the device tag 10 to change the operation state from an inoperative state to an operative state wherein power is provided from the battery 20 to the battery operated device 16 via the device tag 10. In such embodiments, before the battery operated devices 16 and their associated device tags 10 are checked out, the control unit 84 may be constructed and arranged to check for signals being transmitted from the device tags 10 to ensure that the device tags 10 are contained within the predetermined area. If a certain predetermined threshold of time has passed without receipt of transmission from the device tag 10, and the device tag 10 and its associated battery operated device 16 are not checked out (i.e., the object identification code of the device tag 10 is not associated with a valid user identification code), the control unit 84 may determine that the battery operated device 16 and its associated device tag 10 have been removed from the predetermined area without authorization. This event may be considered a hostile event by the control unit 84. In such embodiments, because the battery operated device 16 and its associated device tag 10 were not properly checked out (i.e., the control unit 84 was not able to transmit a signal to the device tag 10 to switch from the inoperative state to the operative state), the battery powered device 16 may not operate without the power being provided from the battery 20 to the battery operated device 16 via the device tag 10. Alternatively or additionally, the control unit 84 may be constructed and arranged to emit an alarm signal to indicate occurrence of the hostile event.

As mentioned above, the removal of the device tag 10 from the battery operated device 16 may also be considered a hostile event. As also mentioned above, the device tag 10 may detect the removal of the device tag 10 from the battery operated device 16, for example, via a switch or sensor. In some embodiments, the switch or sensor may be connected to the latch 32 or may sense movement of the latch 32 to the unlatched position. The controller 96 may receive signals from the sensor or the switch indicating removal of the device tag 10 from the battery operated device 16. In such situations, the controller 96 may cause the device tag 10 to generate an alarm or other indications. The device tag 10 may also transmit such information to the control unit 84. In some embodiments, the control unit 84 may determine whether the user is associated with a user identification device having a user identification code that is permitted to remove the device tag 10. If the user has permission to remove the device tag 10, the removal may be considered an authorized removal by an authorized user. In such embodiments, the control unit 84 might not generate an alarm indication or may send signals to the device tag 10 to prevent any alarm indications in the device tag 10 to be generated. Alternatively, if the user is not authorized to remove the device tag 10, the removal is considered unauthorized and alarms may be generated in one or both of the device tags 10 and the control unit 84. In some embodiments, alarms will be generated by one or both of the control unit 84 and the device tag 10 regardless of whether the removal is by a user with or without permission. In such embodiments, the alarms will be generated whenever the device tag 10 is removed from the battery operated device 16.

Figure 7:
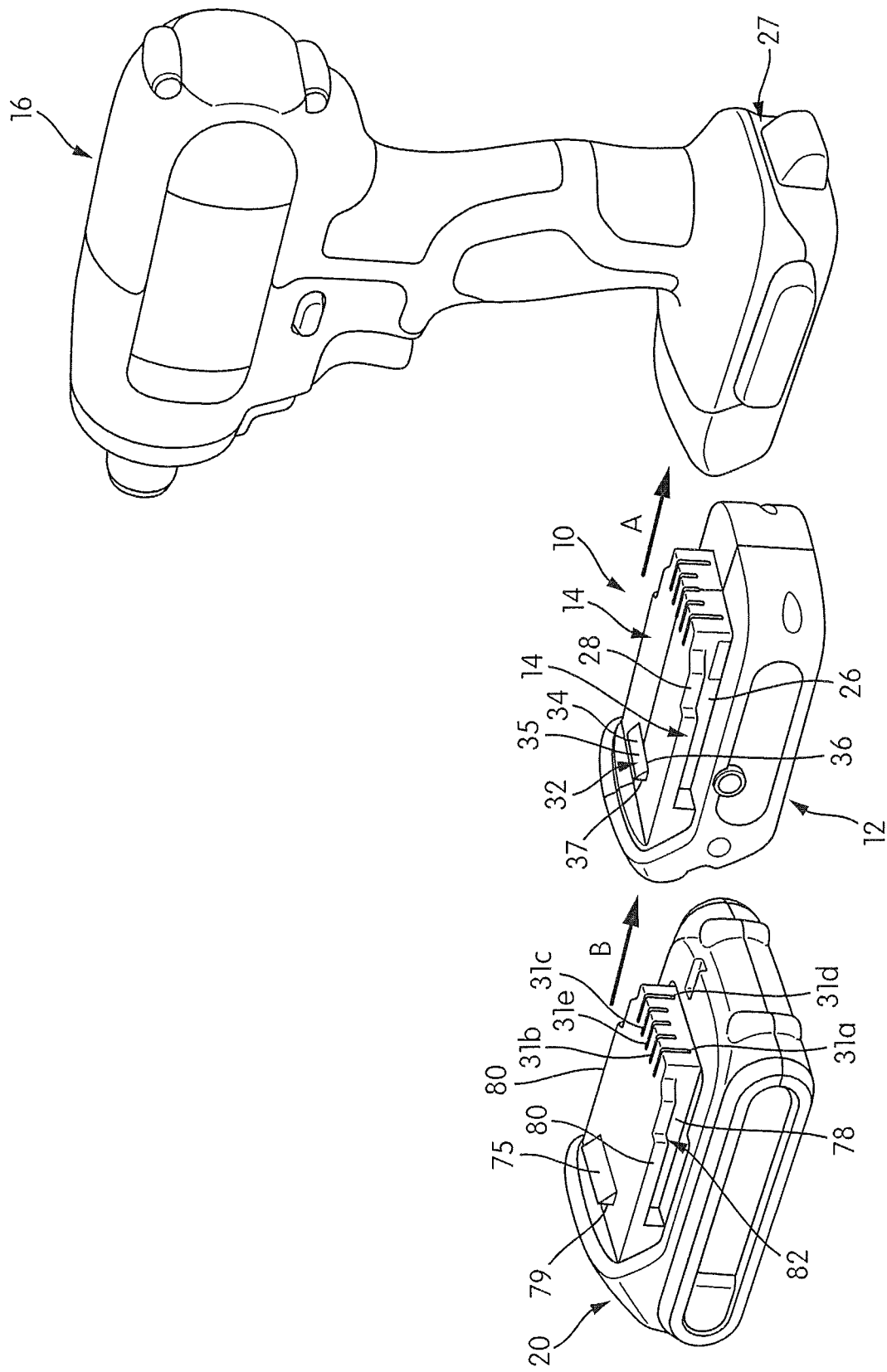
FIG. 7 is a perspective view of the device tag, the battery operated device, and the battery in accordance with an embodiment.

The device tag 10, the battery operated device 16, and the battery 20 may be assembled or connected together as follows in accordance with an embodiment. The device tag 10, battery operated device 16, and battery 20 may initially be disassembled or disconnected, as shown in FIG. 7. As mentioned above, the engaging portion 27 of the battery operated device 16 may have similar connecting structures, latch engaging structure, and blade terminals as the second connecting structures 18, latch engaging structure 73 and blade terminals 66a-66d of the device tag 10. To connect the device tag 10 to the battery operated device 16, the device tag 10 may be slid in the direction of axis A (see FIG. 7) towards the engaging portion 27 of the battery operated device 16. Accordingly, grooves and rails of the connector structures of the engaging portion 27 are constructed and arranged to engage with the rails 28 and grooves 26, respectively, of the second connector structures 18 of the device tag 10. This connection may prevent the vertical movement of the device tag 10 relative to the battery operated device 16. The lateral movement of the device tag 10 relative to the battery operated device 16 may be prevented by the latch 32 and the latch engaging structure formed in the engaging portion 27 of the battery operated device 16. During the connection of the connector structure of the battery operated device 16 and the second connector structures 18 of the device tag 18, the latch 32 of the device tag 10 may be slid against the inner surface of the battery operated device 16. The sloped surface 35 of the latch 32 may cam against or slide against the inner surface of the engaging portion of the battery operated device 16, causing the latch 32 to move to the unlatched position wherein the engaging portion 34 is pushed towards the opening 36 of the housing 12. When the latch 32 has reached the latch engaging structure (similar to the latch engaging structure 73 of the device tag 10) of the engaging portion 27 of the battery operated device 16, the resiliency of the latch or a bias member associated with the latch 32 may bias the latch 32 to the latched position wherein the engaging portion 34 is moved upwards and received in the latch engaging structure (e.g., a groove) formed in the inner surface of the engaging portion 27. The engaging surface 37 of the latch 32 may abut against a portion of the latch engaging surface to prevent movement of the device tag 10 in the direction opposite that of A relative to the battery operated device 16. The terminal connectors of the battery operated device 16 may be similar to the battery terminal blades 66a-66d of the device tag 10. Thus, the terminal connectors may be inserted into the openings 30a-30d of the device tag 10 to electrically connect with the tool terminal blades 64a-64d of the first terminal block 56. Thus, the device tag 10 may be engaged with and latched to the battery operated device 16 and may be electrically connected with the battery operated device 16. In embodiments having a sensor or switch, the sensor or switch may sense the connection of the device tag 10 with the battery operated device 16 and signals may be transmitted to the control unit 84 or to the controller 96 to indicate the connection.

Figure 8:
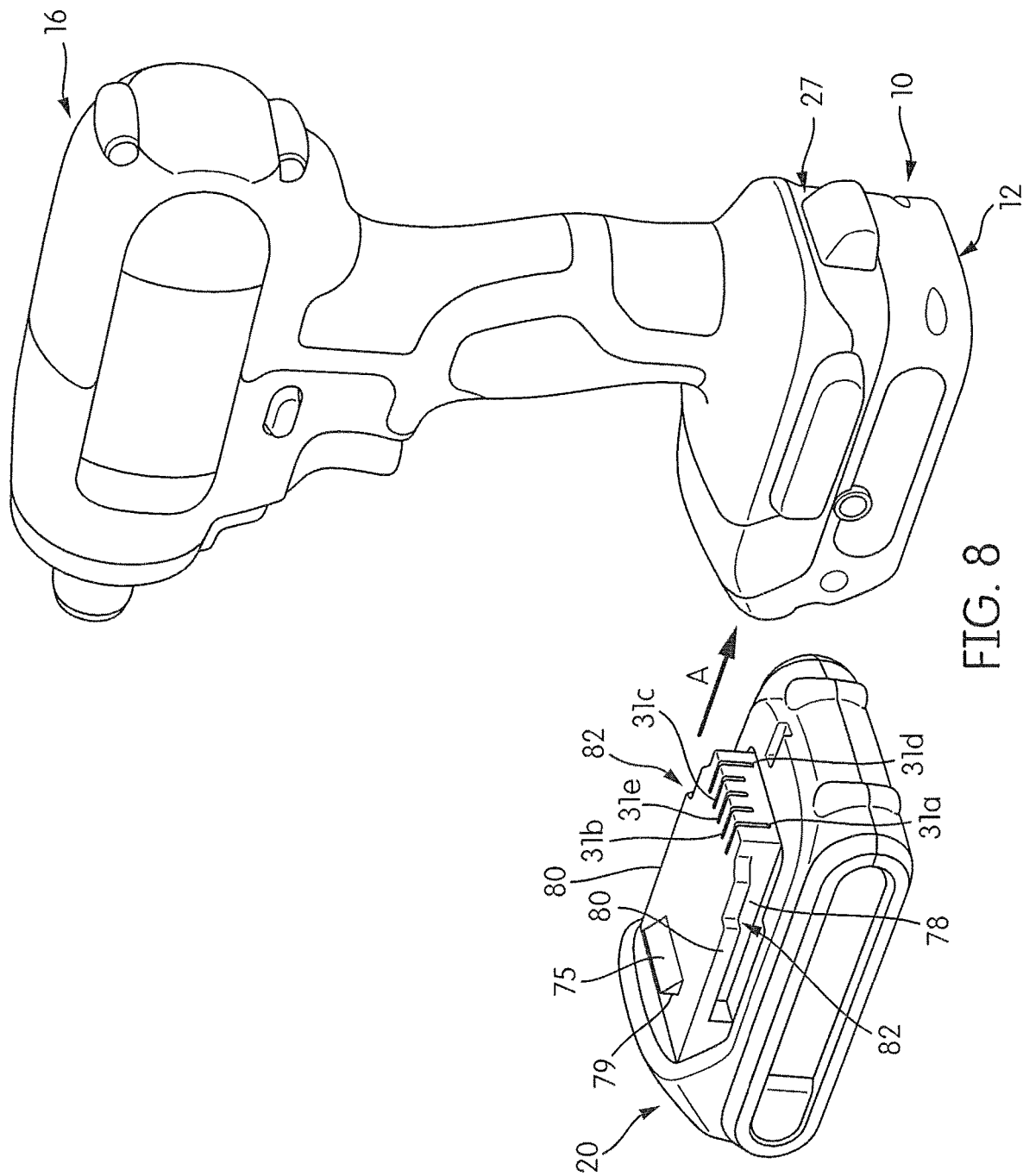
FIG. 8 is a perspective view of the device tag, the battery operated device, and the battery in accordance with an embodiment.

The battery 20 may be connected to the device tag 10 in a similar manner. That is, the battery 20 may be slid towards the device tag 10 in the direction of B along a second axis, as shown in FIG. 8. The axis B may be parallel with the axis A, and the battery 20 may be slid in the same direction to connect to the device tag 10 as the device tag 10 during its connection to the battery operated device 16. The connecting structures 82 of the battery 20 may connect with or be engaged with the second connecting structures 18 of the device tag 10. For example, the grooves 78 of the battery 20 may receive the rails 76 of the device tag 10, and the rails 80 of the battery 20 may be received in the grooves 74 of the device tag 10. This connection may prevent vertical movement of the battery 20 relative to the device tag 10. The lateral movement may be prevented by at least the latch 75 of the battery 20. The latch 75 may have a similar construction and arrangement as the latch 32 of the device tag 10. Accordingly, the latch 75 may be engaged with the latch engaging structure 73 of the device tag 10 in a similar manner as described above with respect to the latch 32 of the device tag 10 and the latch engaging structure of the battery operated device 16. An engaging portion 79 of the latch 75 may abut against the stop portion 77 of the latch engaging structure 73 to prevent movement of the battery 20 in the direction opposite that of axis B from the device tag 10. The battery terminal blades 66a-66d of the device tag 10 may be inserted into the openings 31a-31d of the battery 20 to electrically connect the device tag 10 with the terminal connectors of the battery 20.

The device tag 10, the battery operated device 16, and the battery 20 may be disassembled or disconnected as follows in accordance with an embodiment. To disengage the device tag 10 from the battery operated device 16, the latch 32 (for example, as shown in FIG. 4b) of the device tag 10 may be moved to the unlatched position by engaging the contact portion 52 of the latch 32. The contact portion 52 may be depressed to move the latch 32 to the unlatched position wherein the engaging portion 34 is moved towards the opening 36 of the housing 12. Accordingly, the engaging portion 34 of the latch 32 is removed from the latch engaging structure of the engaging portion 27 of the battery operated device 16 and the engaging surface 37 is no longer abutting against a portion of the latch engaging structure to prevent lateral movement of the device tag 10 relative to the battery operated device 16. The device tag 10 may then be slid in a direction opposite that of A away from the battery operated device 16 (for example, as shown in FIG. 7). During this sliding movement, the first connector structures 14 of the device tag 10 may be disconnected or disengaged from corresponding connector structures of the battery operated device 16. As mentioned above, the removal of the device tag 10 from the battery operated device 16 may generate alarms or other indications. Signals may also be transmitted to the control unit 84 when the device tag 10 senses the removal thereof from the battery operated device 16. The device tag 10 and/or the control unit 84 may generate alarms or other indications to indicate unauthorized removal. As mentioned above, in some embodiments, if the control unit 84 determines that the user has permission to remove the device tag 10 from the battery operated device 16, the alarms or other indications might not be generated or might cease to be generated.

The battery 20 may be removed from the device tag 10 in a similar manner. That is, the latch 75 of the battery 20 may be moved to the unlocked position wherein the engaging portion 79 is removed from the latch engaging structure 73 of the device tag 10. Thus, the stop portion 77 of the device tag 10 may no longer abut against the engaging portion 79 to prevent sliding movement of the battery 20 relative to the device tag 10. The battery 20 may then be slid in a direction opposite that of B (for example, as shown in FIG. 7). During the sliding movement, the connector structures 82 of the battery 20 may be disconnected from the second connector structures 18 of the device tag 10. In some embodiments, it is contemplated that there may also be sensors on the device tag 10 to detect removal of the battery 20. In such embodiments, alarms or other indications may be generated by one or both of the device tag 10 and the control unit 84 to indicate the removal of the battery 20 from the device tag 10.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A power tool system, comprising:
   a power tool; and
   a transmitter device attached to the power tool;
   wherein the transmitter device comprises a transmitter device housing;
   wherein a transmitter device battery, a controller and a transmitter are housed in the transmitter device housing;
   wherein the transmitter is configured to transmit wireless signals;
   wherein the transmitter device battery provides power to at least one of the controller and the transmitter; and
   further comprising a power tool battery pack, the power tool battery pack configured to power the power tool and the power tool battery pack is separate from the transmitter device.

2. The power tool system of claim 1, wherein the controller comprises a microprocessor.

3. The power tool system of claim 2, wherein the controller comprises a memory.

4. The power tool system of claim 1, further comprising an actuator which is actuatable by a user.

5. The power tool system of claim 4, wherein the transmitter sends a wireless signal in response to the actuator being actuated.

6. The power tool system of claim 1, wherein the transmitter is configured to send a signal indicative of the transmitter device being removed from the power tool.

7. The power tool system of claim 1, wherein the transmitter device further comprises a receiver and the transmitter device is configured to disable the power tool when it receives a signal from a control unit instructing the transmitter device to disable the power tool.

8. The power tool system of claim 7, wherein the control unit comprises a power supply, a processor and a user interface.

9. The power tool system of claim 8, wherein the control unit is configured to activate an alarm in response to a signal from the transmitter device of an unauthorized use.

10. The power tool system of claim 1, wherein the transmitter device housing includes at least a first portion and a second portion which are connected together to enclose a space therebetween.

11. The power tool system of claim 10, wherein the first portion and second portion are attached together by one or more fasteners.

12. The power tool system of claim 8, wherein the transmitter device communicates with the control unit via a Bluetooth protocol.

13. A power tool system, comprising:
    a power tool; and
    a transmitter device attached to the power tool;
    wherein the transmitter device comprises a transmitter device housing;
    wherein a battery, a controller and a transmitter are housed in the transmitter device housing;
    wherein the transmitter is configured to transmit wireless signals;
    wherein the battery provides power to at least one of the controller and the transmitter;
    wherein the transmitter device further comprises a receiver and the transmitter device is configured to disable the power tool when it receives a signal from a control unit instructing the transmitter device to disable the power tool;
    wherein the control unit comprises a power supply, a processor and a user interface; and
    wherein the transmitter of the transmitter device sends a signal to the control unit when the transmitter device is taken out of a specified area.

14. A power tool system, comprising:
    a power tool; and
    a transmitter device attached to the power tool;
    wherein the transmitter device comprises a transmitter device housing;
    wherein a battery, a controller and a transmitter are housed in the transmitter device housing;
    wherein the transmitter is configured to transmit wireless signals;
    wherein the battery provides power to at least one of the controller and the transmitter;
    wherein the transmitter device further comprises a receiver and the transmitter device is configured to disable the power tool when it receives a signal from a control unit instructing the transmitter device to disable the power tool;
    wherein the control unit comprises a power supply, a processor and a user interface; and
    wherein the control unit provides an indication to a user when the transmitter device is taken out of the specified area.

15. The power tool system of claim 14, wherein the power tool is disabled when the transmitter device is taken out of the specified area.

* * * * *